3,265,708
N-PARAHYDROXYPHENYLMALEIMIDE
AND PROCESSES FOR ITS PRODUCTION
Charles H. Stiteler, Hillsdale, N.J., assignor to United States Rubber Company, New York, N.Y., a corporation of New Jersey
No Drawing. Filed Apr. 1, 1964, Ser. No. 356,633
3 Claims. (Cl. 260—326.5)

This application is a continuation-in-part of application Serial No. 92,463, filed March 1, 1961.

This invention relates to the new chemical, symmetrical N-(4-hydroxyphenyl) maleimide, and to a method of preparing same. The invention further relates to the use of the new chemical as a vulcanizing agent for highly unsaturated rubbers, and as a polymerizable monomer for the preparation of homopolymers and copolymers.

The new chemical is represented by the following formula:

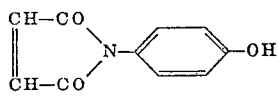

According to the invention the new chemical is prepared by the alcoholysis of N-(4-acetoxyphenyl) maleimide. The said N-(4-acetoxyphenyl) maleimide is first prepared in known manner from the N-(4-hydroxyphenyl) maleamic acid described by Piutti, Atti accad. Lincei, 17, [5], 635–641; 18, [2], 312–26. The acetylation, and concurrent ring closure, to form N-(4-acetoxyphenyl) maleimide, may be carried out by the general method of Searle, U.S. Patent 2,444,536. Alcoholysis is then effected by heating the acetoxyphenyl-maleimide in methanol in the presence of a small amount of a strong acid catalyst such as sulfuric acid or p-toluene-sulfonic acid. The new chemical of the invention is then recovered from the reaction mixture.

The invention may be illustrated by the following examples.

*Preparation of N-(4-acetoxyphenyl) maleimide*

Thirteen hundred grams of acetic anhydride, 90 grams of sodium acetate and 315 grams of N-(4-hydroxyphenyl) maleamic acid were mixed and heated, with agitation, at 70° C. for one-half hour, then poured into water. The solid which formed was filtered off, washed with water until the acetic acid had been removed, and air-dried, to yield 210 grams of a product melting at 143°–150° C. This product is soluble in hot benzene and in hot ethanol. Recrystallization from ethanol gave a product melting at 160°–161° C., and was found by analysis to contain 6.05% of nitrogen [theoretical for N-(acetoxyphenyl) maleimide, 6.05% N].

*Preparation of symmetrical N-(4-hydroxyphenyl) maleimide*

A mixture of 744 grams of N-(4-acetoxyphenyl) maleimide, 1 gram of p-toluenesulfonic acid and 2232 grams of methanol was heated to reflux under a partial take-off column until removal of the azeotropic mixture of methanol and methyl acetate was complete. This required about 14 hours and was indicated by the rise of the head temperature to the boiling point of methanol. The alcohol was distilled off, leaving 656 grams of orange-colored crystals, melting at 135–175° C. Recrystallization from isopropanol, then from water, gave yellow needles, M.P. 181–182° C.

*Analysis.*—63.7% C, 3.8% H, 7.4% N. Theoretical composition of N-(4-hydroxyphenyl) maleimide: 63.7% C, 3.8% H, 7.4% N.

The yellow product is accordingly a new sym-4-hydroxyphenyl-maleimide melting at 181°–182° C.

*Homopolymerization of sym-N-(4-hydroxyphenyl) maleimide*

A solution of 7.5 grams of N-(4-hydroxyphenyl) maleimide and 0.164 gram of 1,1'-azobisisobutyronitrile in 500 ml. of dioxan was heated to 60–65° C. under nitrogen for 4 hours. After filtration through glass wool the polymer which had formed was precipitated by addition of benzene to yield 80 grams of pale yellow, acetone-soluble polymer, with an intrinsic viscosity of 0.4; N found, 6.7%. The polymer can be converted to a cohesive film or sheet. The polymer does not melt when heated to 400° C. but chars slightly at this temperature.

*Copolymer with styrene*

A solution of 189 grams of sym-N-(4-hydroxyphenyl) maleimide, 104 grams of styrene and 0.82 gram of 1,1'-azobisisobutyronitrile in 1465 grams of acetone was heated to reflux for 2 hours. The polymer which formed was precipitated by dilution with 5 gallons of isopropanol. After filtration and washing with isopropanol until free of color the polymer was purified by solution in acetone and reprecipitation with isopropanol. A yield of 176 grams of polymer having the appearance of asbestos fibers was obtained.

*Analysis.*—Found, 4.4% N. Calculated for a 1:1-molar copolymer, 4.7% N.

The intrinsic viscosity was found to be 2.01. The copolymer can be molded or extruded to form solid objects, sheets, or elongate extrudates.

*Copolymer with ethyl acrylate*

A solution of 94.5 grams of sym-N-(4-hydroxyphenyl) maleimide, 50 grams of ethyl acrylate, and 0.42 gram of 1,1'-azobisisobutyronitrile in 1300 grams of acetone was refluxed for 4 hours. After filtration, the solution was concentrated in vacuo and the concentrate diluted with benzene to precipitate the product; yield, 90 grams of solid polymer. After purification by solution in acetone and reprecipitation by benzene the dried polymer had an intrinsic viscosity of 0.55 and softened but did not melt at 200° C.

*Analysis.*—Found, 4.6% N. Calculated for 1:1-molar copolymer, 4.8% N.

It can readily be molded or extruded.

*Vulcanization of rubber*

Styrene/butadiene copolymer rubber (100 parts by weight), when mixed with 50 parts of carbon black, 7.5 parts of light hydrocarbon processing oil, 4.4 parts of sym-N-(4-hydroxyphenyl) maleimide and either 1 part of 2,2'-dithiobisbenzothiazole or 1 part of dicumyl peroxide, and press cured for 45 minutes at 293° F., gave vulcanizates having tensile strength of 1430 and 2000 pounds per square inch, respectively, the elongation at break being 630% and 450%, and the modulus at 300% extension being 575 and 1250 p.s.i. Similar rubber mixes containing all but the N-(hydroxyphenyl) maleimide did not cure under the same conditions.

In similar manner other highly unsaturated rubbers, both natural and synthetic, may be vulcanized, e.g., Hevea, synthetic cis-polyisoprene, cis-polybutadiene, and rubber copolymers of butadiene with α-methylstyrene, acrylonitrile, methyl methacrylate, ethyl acrylate, and the like.

Having thus described my invention, what I claim and desire to protect by Letters Patent is:

1. Symmetrical N-(4-hydroxyphenyl) maleimide having a melting point of 181°–182° C.

2. A process which comprises heating N-(4-acetoxyphenyl) maleimide in the presence of methanol and a small amount of sulfuric acid, and recovering symmetrical N-(4-hydroxyphenyl) maleimide.

3. A process which comprises heating N-(4-acetoxyphenyl) maleimide in the presence of methanol and a small amount of p-toluenesulfonic acid, and recovering symmetrical N-(4-hydroxyphenyl) maleimide.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,321,493 | 6/1943 | Korten | 260—47 |
| 2,744,882 | 5/1956 | Bender et al. | 260—47 |
| 2,975,193 | 3/1961 | Dice et al. | 260—326.5 |
| 3,018,290 | 1/1962 | Sauers et al. | 260—326.3 |
| 3,077,478 | 2/1963 | Bertnick et al. | 260—326.5 |
| 3,078,276 | 2/1963 | Koller et al. | 260—326.5 |
| 3,123,618 | 3/1964 | Schuman et al. | 260—313 |

OTHER REFERENCES

Piutti, "Gass. Chimica Italiana," vol. 40, page 488 (1910) at page 504.

Boucherle et al., "Societe Chimique de France," Bulletin, pages 500-507, March 1960, abstracted in "Chemical Abstracts," vol. 5, page 1403 (1911).

Buess-Thiernagand et al., "Chemical Abstracts," pages 12,236–12,237, vol. 47 (1953).

HENRY R. JILES, *Acting Primary Examiner.*

NICHOLAS S. RIZZO, *Examiner.*

J. TOVAR, *Assistant Examiner.*